United States Patent
Surdu

(10) Patent No.: US 10,949,531 B2
(45) Date of Patent: Mar. 16, 2021

(54) SECURE AND RELIABLE CONTENT DISARM AND RECONSTRUCTION CLOUD SERVICE

(71) Applicant: Oleksii Surdu, Broadlands, VA (US)

(72) Inventor: Oleksii Surdu, Broadlands, VA (US)

(73) Assignee: InZero Technologies, LLC, Sterling, VA (US)

( * ) Notice: Subject to any disclaimer, the term of this patent is extended or adjusted under 35 U.S.C. 154(b) by 388 days.

(21) Appl. No.: 16/106,282

(22) Filed: Aug. 21, 2018

(65) Prior Publication Data

US 2020/0065477 A1 Feb. 27, 2020

(51) Int. Cl.
| | |
|---|---|
| *G06F 21/53* | (2013.01) |
| *G06F 9/455* | (2018.01) |
| *G06F 16/11* | (2019.01) |
| *G06F 21/56* | (2013.01) |

(52) U.S. Cl.
CPC .......... *G06F 21/53* (2013.01); *G06F 9/45558* (2013.01); *G06F 16/116* (2019.01); *G06F 21/56* (2013.01); *G06F 21/562* (2013.01); *G06F 21/568* (2013.01); *G06F 2009/45587* (2013.01); *G06F 2221/034* (2013.01)

(58) Field of Classification Search
CPC ........ G06F 21/53; G06F 21/56; G06F 21/562; G06F 21/568; G06F 16/116; G06F 2009/45587; G06F 21/566
See application file for complete search history.

(56) References Cited

U.S. PATENT DOCUMENTS

| | | |
|---|---|---|
| 9,749,295 B2 | 8/2017 | McDougal |
| 9,858,424 B1 | 1/2018 | Grafi |
| 9,954,875 B2 | 4/2018 | Boivie |
| 2015/0205964 A1* | 7/2015 | Eytan ............. G06F 21/568 726/23 |
| 2016/0269422 A1 | 9/2016 | McDougal |
| 2018/0218155 A1* | 8/2018 | Grafi ............. G06F 21/568 |

* cited by examiner

*Primary Examiner* — Huan V Doan
(74) *Attorney, Agent, or Firm* — Capitol City TechLaw, PLLC; Jasbir Singh

(57) ABSTRACT

The present teachings disclose a file Content Disarm and Reconstruction (CDR) system and method. The system includes: a disarm environment comprising disarm sandboxes to transform a file; a separate reconstruct environment; and a controller to classify a file content of a file as a filetype, to provide the file and the filetype to a selected disarm sandbox of the disarm sandboxes for transformation, to receive one or more disarmed files from the selected disarm sandbox, to provide the one or more disarmed files to the reconstruct environment, and to receive a reconstructed file from the reconstruct environment, wherein the disarm environment, the reconstruct environment, and the controller are isolated and separated from one another by hardware. Isolated and separate Virtual Machines (VMs) may host the controller, the disarm environment and the reconstruct environment. The VMs may be disposable VMs that include an application sandbox environment. The VMs may be provided by a cloud service.

21 Claims, 7 Drawing Sheets

SECURE AND RELIABLE CONTENT DISARM AND RECONSTRUCTION CLOUD SERVICE

FIELD

A computing system and method that provides file Content Disarm and Reconstruction (CDR) transformation implemented as a service including a gateway, controller, and separate disarm and reconstruct environments are disclosed. A cloud service for CDR is also disclosed.

BACKGROUND

Content Disarm and Reconstruction, or sometimes, Data Sanitization (both hereafter "CDR") attempts to protect a computer Operating System (OS) from receiving infected files or malware by removing disallowed file components within an allowed file type definition or which file components are otherwise forbidden by security policies. CDR typically consists of a software application that recognizes file formats, strips unrecognized or disallowed formats (the disarm function), and either only permits completely allowed files in their entirety to continue to the addressee computer, or reconstructs the file by limiting the transmitted file to only those file components that are recognized and allowed (the reconstruction function).

CDR is generally used to protect an organization's network perimeter including email, web-based files, incoming or transmitted files, and removable media-based files. This protection is accomplished at times using cloud virtualization that is generally based on virtual machine (VM) technology. However, known commercial CDR is susceptible to malware infections, which is a problem that is addressed by the teachings, methods and systems of the present disclosure.

Various patent publications that may be of interest to readers of the present application include [1] Boivie, "Protecting From Unintentional Malware Download", U.S. Pat. No. 9,954,875 B2, [2] Grafi, "System And Method For Protecting Systems From Active Content", U.S. Pat. No. 9,858,424 B1, [3] Mcdougal, "Systems And Methods For Malware Nullification", Pub. No.: US 2016/0269422 A1, and [4] Mcdougal, "Systems And Methods For Internet Traffic Analysis", U.S. Pat. No. 9,749,295 B2.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a file Content Disarm and Reconstruction (CDR) system. The system includes: a disarm environment comprising disarm sandboxes to transform a file; a reconstruct environment; and a controller to classify a file content of a file as a filetype, to provide the file and the filetype to a selected disarm sandbox of the disarm sandboxes for transformation, to receive one or more disarmed files from the selected disarm sandbox, to provide the one or more disarmed files to the reconstruct environment, and to receive a reconstructed file from the reconstruct environment, wherein the disarm environment, the reconstruct environment, and the controller are isolated and separated from one another by hardware. Isolated and separate Virtual Machines (VMs) may host the controller, the disarm environment and the reconstruct environment. The VMs may be disposable VMs that include an application sandbox environment. The VMs may be provided by a cloud service.

Additional features will be set forth in the description that follows, and in part will be apparent from the description, or may be learned by practice of what is described.

BRIEF DESCRIPTION OF THE DRAWINGS

In order to describe the way the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

Figure 1:
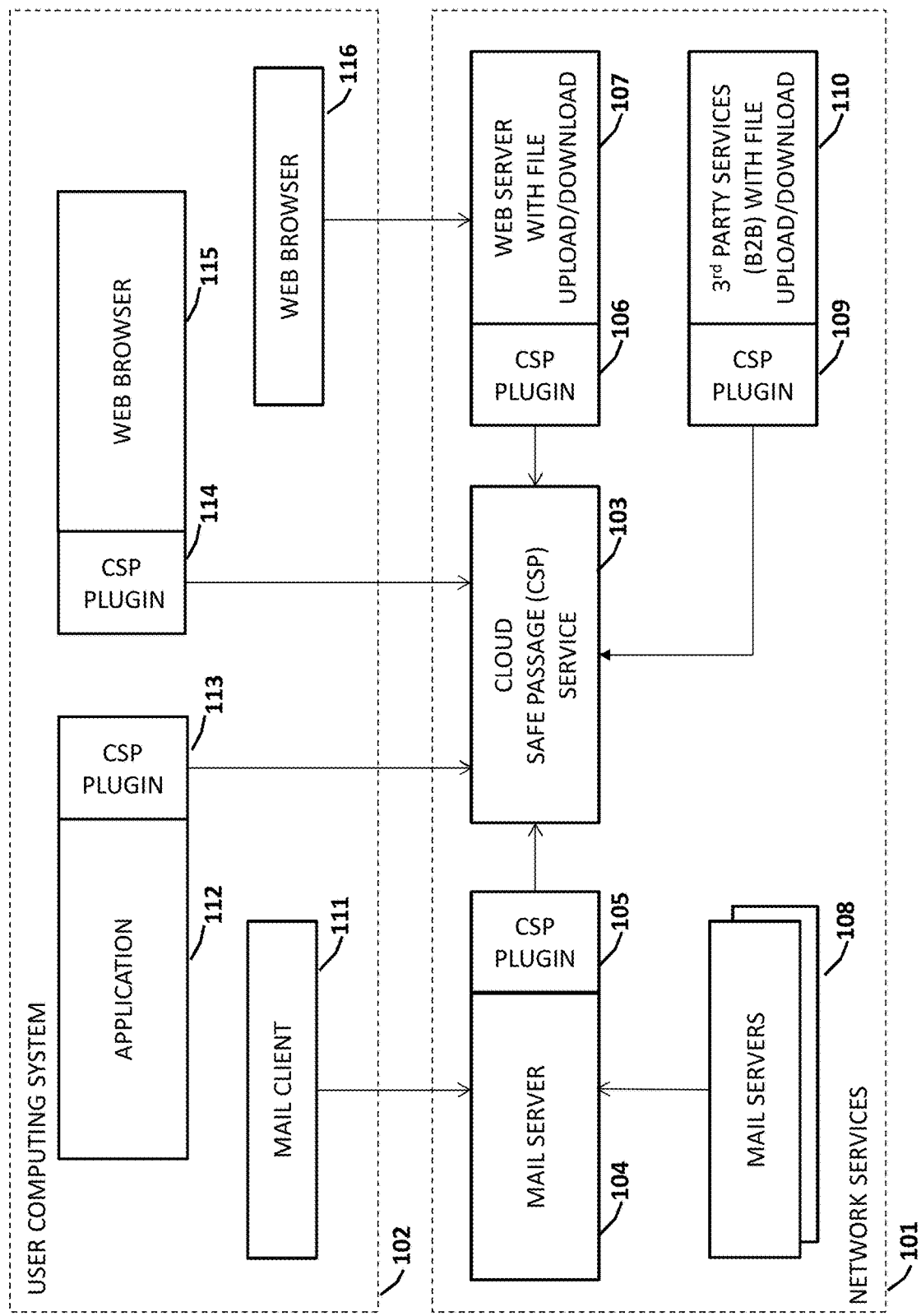
FIG. 1 depicts a general service model of a CDR system according to some embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced item. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In various computing methods and systems, cloud virtualization can be utilized and can be based on VMs, where the VM is a software implementation that emulates a computing system and can execute the same programs as a physical computer. Multiple VMs can be run in parallel on the one physical computing system called the "host". Cloud computing often combines a large amount of distant computing systems into a virtualized and configurable network to provide customers computing services, storage and processing power from a common, centralized vendor. A new VM creation from a template may include: selecting an available server/computer to run a new VM, copying a VM file system image (VM file system image may be the VM template) to a new location and starting the new VM from the template. In some embodiments, copying of a VM file system image may be omitted if the file system or its parts are read-only.

In computer security, a sandbox is a security mechanism for separating running programs, usually in an effort to mitigate system failures or software vulnerabilities from spreading. A sandbox may be used to execute untested or untrusted programs or code, without risking harm to the host machine or operating system. A sandbox typically provides a tightly controlled set of resources for programs to run in, such as scratch space on disk and memory. Network access, the ability to inspect the host system or read from input devices are usually disallowed or heavily restricted."

VMs can be infected with malware in the same way as infecting a physical computing system. This risk applies to a CDR system. A CDR system can contain vulnerabilities allowing malware to overcome and infect the CDR system itself. This risk is increased by the fact that generic implementations of CDR often rely on the same software libraries as other software, and these libraries can have vulnerabilities, too. When these vulnerabilities are exploited by malware, the CDR itself can be become a conduit for malware spread, just as antivirus infections have been known to allow malware to spread among antivirus subscribers. Thus, if CDR applications intended to strip malware become compromised, it can not only cause the undetected malware still resident in the subject file to continue on to the addressee, but can also allow the CDR application to infect subsequent files. This failure of the disarm function to successfully strip malware allows the malware to infect future files in the disarm function and allows the reconstruction function to continue to pass malware to addressees.

The present teachings advance CDR security by addressing the major risks of CDR by eliminating or reducing the chance that effective malware, even if able to overcome the disarm function, will be passed to the addressee, or will remain resident in the disarm function and infect future files. The present teachings separate and isolate the disarm and reconstruct functions to assure that a reconstructed file is derived only from allowable code and that the reconstructed file was not infected in disarming or reconstructing. The present teachings disclose a single-use environment for the disarm function, which can assure that any undetected malware has not remained resident in the CDR application. The present teachings do not reuse a disarm environment to process a subsequent file. The different environments assure transmittal of only clean and valid content and the reconstruction function can proceed with only allowed content even if disallowed content exists in the incoming file. In some embodiments, it becomes unnecessary to reject the entire file.

Some embodiments provide safe viewing of the original file to facilitate, for example, a comparison of the original file with a resulting file. The safe viewing can assure that no inadvertent change in content, format, or other aspect of the resulting file happens during the CDR. It also provides convenience and comfort to the user to be able to personally assure himself or herself of exact file replication. The present teachings may be performed automatically without user interaction.

The present teachings prevent a spread of infected data files through the communication channels and address multiple security threats including attacks on the CDR system itself. The present teachings can be extended to protect executable files and communication/network protocols.

In some embodiments, the CDR is split into separate software modules. The disarm function is performed in a hardware-isolated and disposable disarm environment. A compromise of the disarm environment cannot lead to further system compromise. Such an approach can be effective for previously unknown zero-day attacks.

In some embodiments, CDR is performed as a cloud service for the customer, i.e., as a "Cloud Safe Passage" (CSP). As such, CSP may process data files during transfer from one computing system to another. The CSP may use strict hardware-enforced environment separation to perform data disarm and reconstruction functions.

FIG. 1 depicts a general service model of a CDR system according to some embodiments. The model can include a user computing system 102 and network services 101. The network services 101 can include a CSP service 103. The CSP service 103 can be used with multiple network services 101, such as a mail server 104 via a CSP plugin 105, a web server 107 via a CSP plugin 106, or a 3rd party business-to-business (B2B) service 110 via a CSP plugin 109. The user computing system 102 can include an application 112 or a web browser 114 that each utilizes the CSP service 103 via plugins 113 and 114, respectively. In some embodiments, a regular mail client 111 or a web browser 116 may utilize the CSP service 103 via the mail server 104 or the Web server 107.

In some embodiments, other network services and applications (not shown) that require data disarm and reconstruction functionality can use the CSP service 103.

Figure 2:
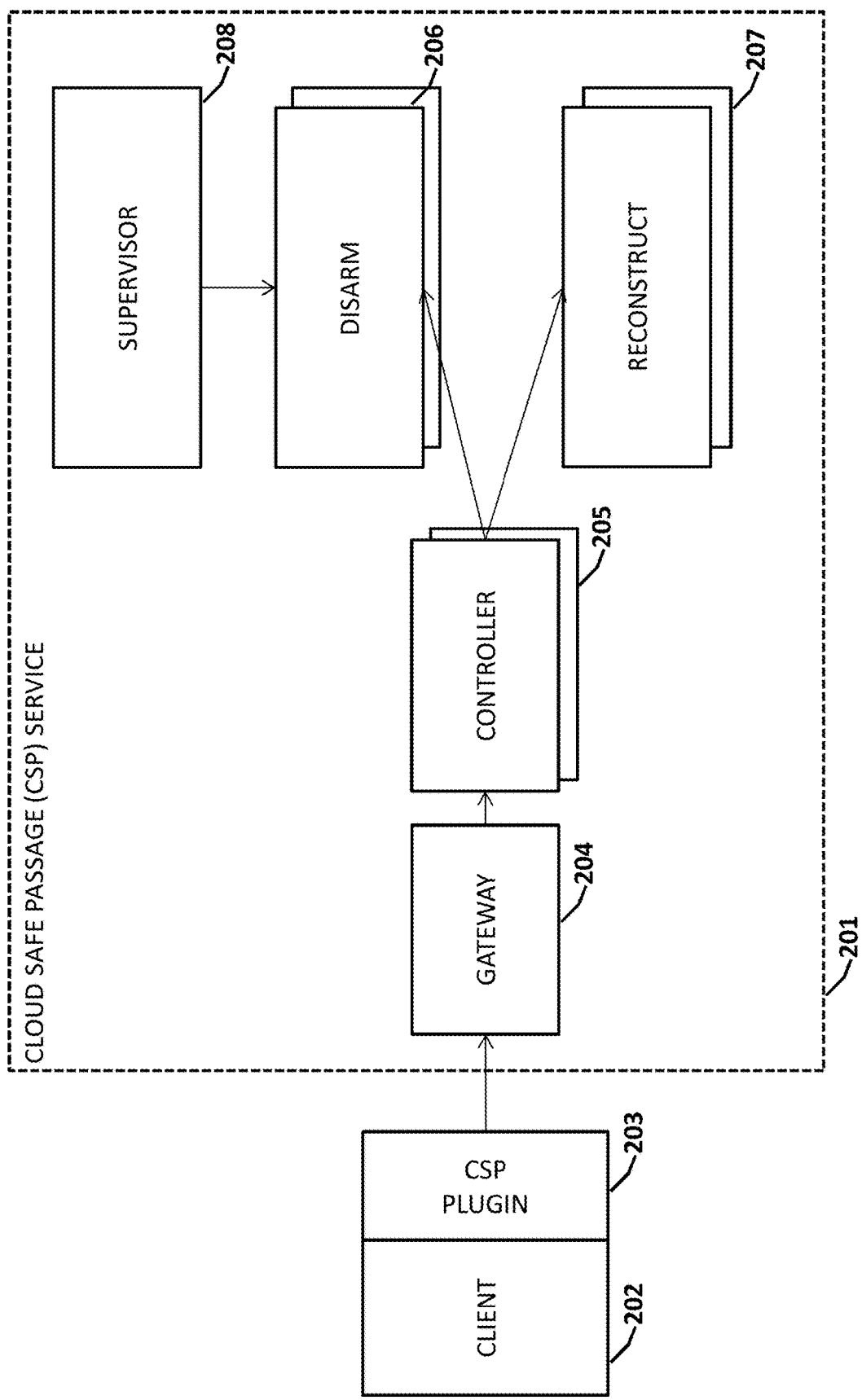
FIG. 2 illustrates a logical Cloud Safe Passage (CSP) Service model according to some embodiments.

FIG. 2 illustrates a logical CSP Service model according to some embodiments. A client 202 uses a CSP Service 201 via a CSP plugin 203. In some embodiments, the client 202 can be a mail server, web server, network application or other type of software (see for example FIG. 1).

The CSP service 201 can include a gateway 204, a controller 205, a disarm environment 206 and a separate reconstruct environment 207. One or more of the gateway 204, the controller 205, the disarm environment 206 and the reconstruct environment 207 may be implemented by a virtual machine (VM). The gateway 204 may perform validation, authentication, authorization and routing of an incoming request via a configured pipeline. In the cloud service embodiment, the gateway 204 may provide service scalability and load balancing. In some embodiments, the gateway 204 can be implemented as one or multiple VMs deployed on one or more servers. In other embodiments, the gateway 204 can be implemented as a serverless cloud service, for example, a service based on an Amazon Application Programming Interface (API) gateway.

Figure 3:
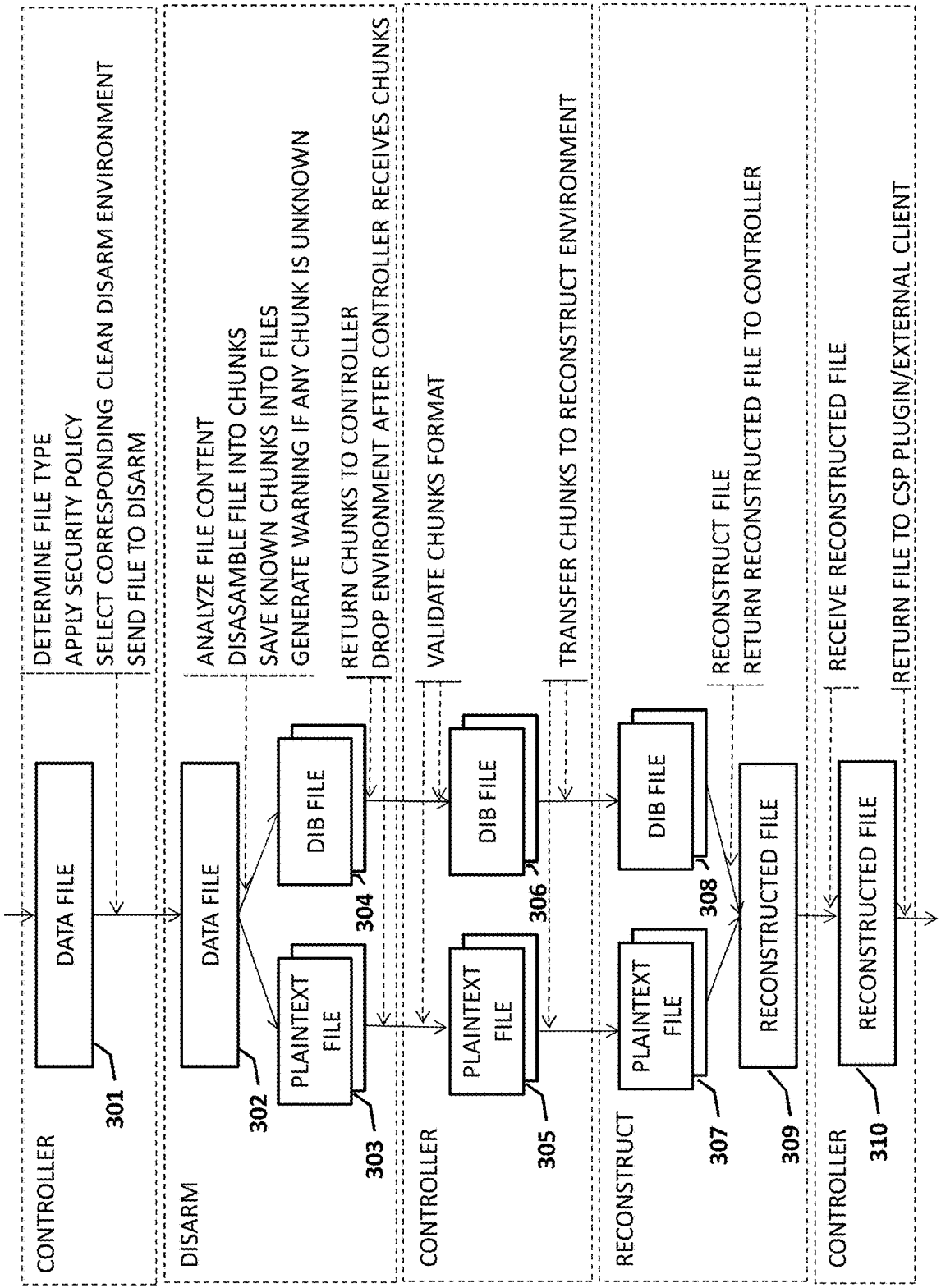
FIG. 3 illustrates a file disarm and reconstruction method according to some embodiments.
Figure 4:
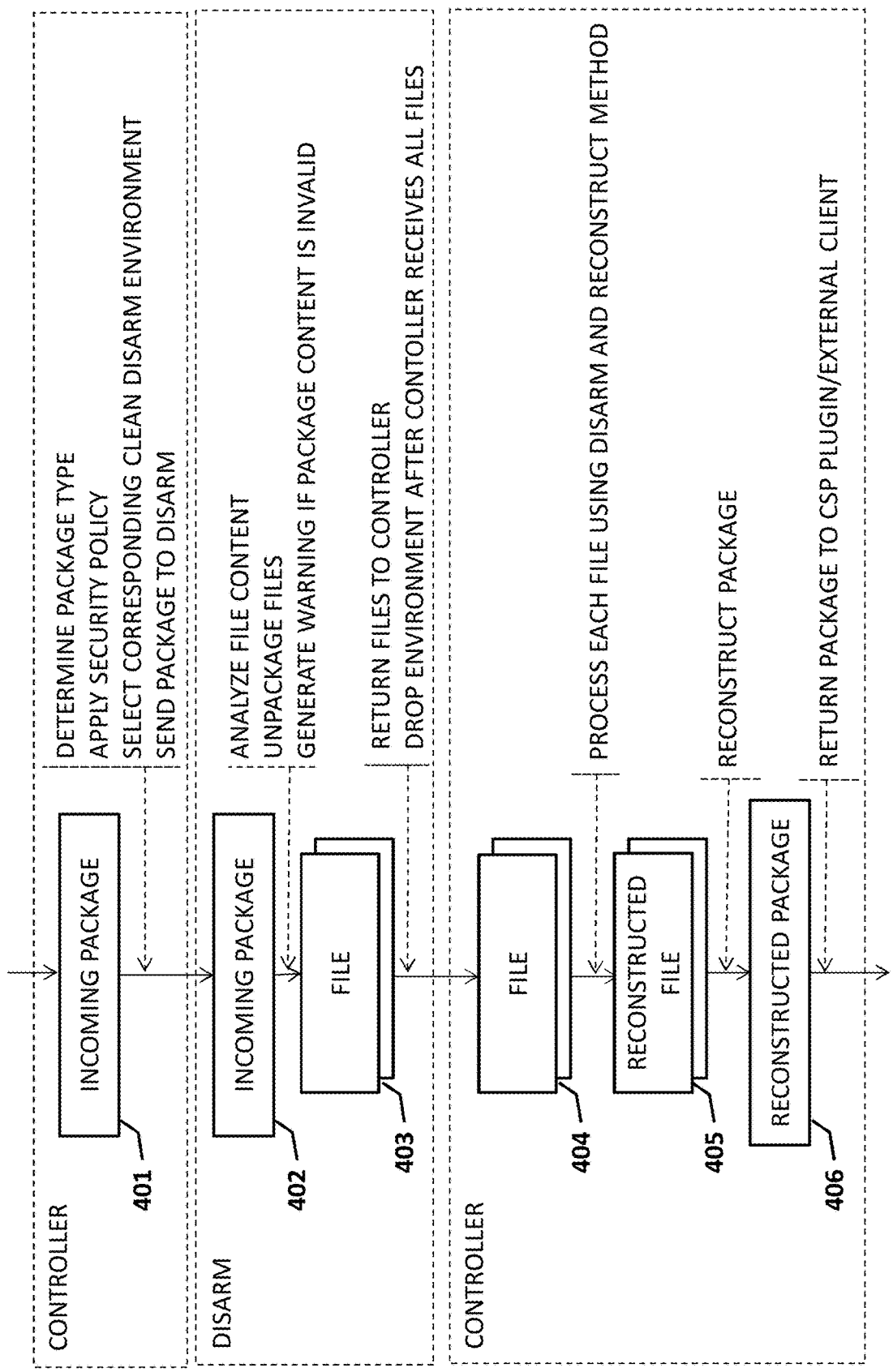
FIG. 4 depicts a package disarm and reconstruction method according to some embodiments.
Figure 5:
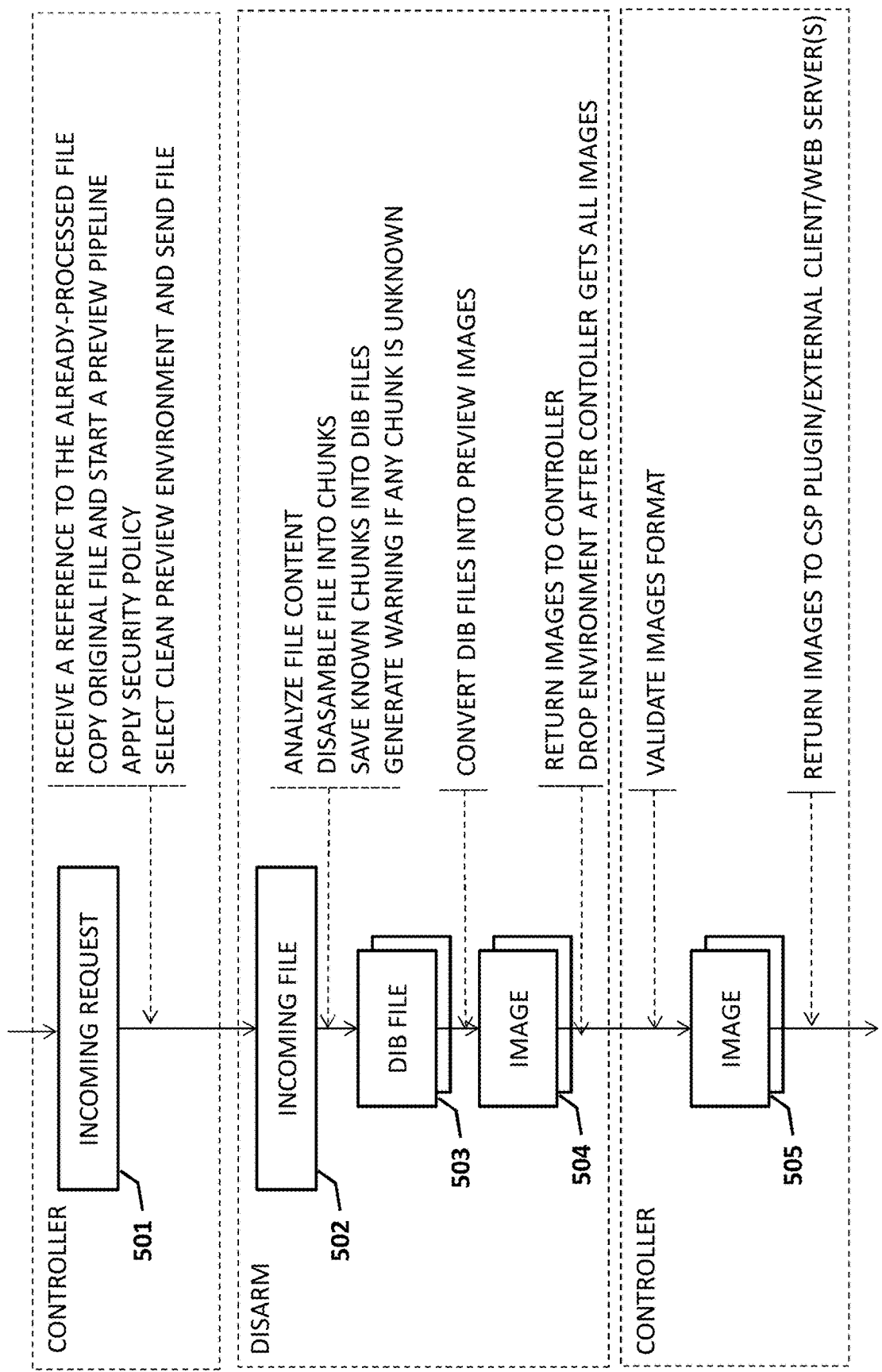
FIG. 5 illustrates a view original data file method according to some embodiments.

The controller 205 plays a leading role in FIGS. 3-5. The controller 205 performs the initial data file content analysis and classification, for example, via Multipurpose Internet Mail Extensions (MIME) type detection, via a file name suffix, or the like. The controller 205 may apply a security policy based on the determined file type, and, if needed, perform the necessary data routing between an available hardware-isolated disarm environment 206, itself and an available reconstruct environment 207. In some embodiments, the controller 205 analyzes a file header to determine the file type and does not perform a deep content analysis of the data file. This minimizes a significant risk to the controller 205 and prevents compromising the controller 205 even if the data file is infected. Some embodiments of the controller 205 can use advanced content analysis, for example Artificial Intelligence (AI) analysis to determine the file type. A disposable environment like the disarm environment 206 may be used to perform the advanced content analysis. In some embodiments, the controller 205 can be implemented as one or multiple VMs deployed on one or more servers. In other embodiments, the controller 205 can be implemented as a serverless cloud service, for example, a service based on an Amazon Application Programming Interface (API) gateway.

In some embodiments, the controller 205 can perform additional data file classification analysis such as antivirus and antimalware file scans. CDR provides additional protection than merely using antivirus or antimalware file. As such, CDR is used even when antivirus or antimalware determines that the file is safe. In some embodiments, the data file can be processed through the CDR, regardless of antivirus or antimalware file scan results.

The disarm 206 and reconstruct 207 environments are isolated from other parts of the CSP Service and each can perform a limited number of operations. The disarm 206 and reconstruct 207 environments can be implemented as VMs or dedicated servers depending on the overall system security requirements. In some embodiments, no outgoing network connections are allowed for either the disarm 206 or the reconstruct 207 environments. The disarm 206 and reconstruct 207 environments may be implemented as a disposable VM with a life cycle as depicted on the FIG. 6. The disposable VM can include independent application sandboxes that can be used to perform any potentially dangerous operation. In some embodiments, an application sandbox is released or removed after one use. To further increase the security level, a disposable VM, such as a disarm environment 206, includes only one sandbox; the disposable VM may be disposed of after each use. The reconstruct VM works with assured clean content from the data file and may be reused for different data files or be disposed of after certain number of uses.

In some embodiments, multiple controllers, disarm environments and reconstruct environments may be used to minimize CSP Service response time and to provide overall system scalability. One or more of the multiple controllers, disarm environments and reconstruct environments may be implemented with VMs. One or more of the multiple controllers, disarm environments and reconstruct environments may be implemented with disposable VMs.

Figure 6:
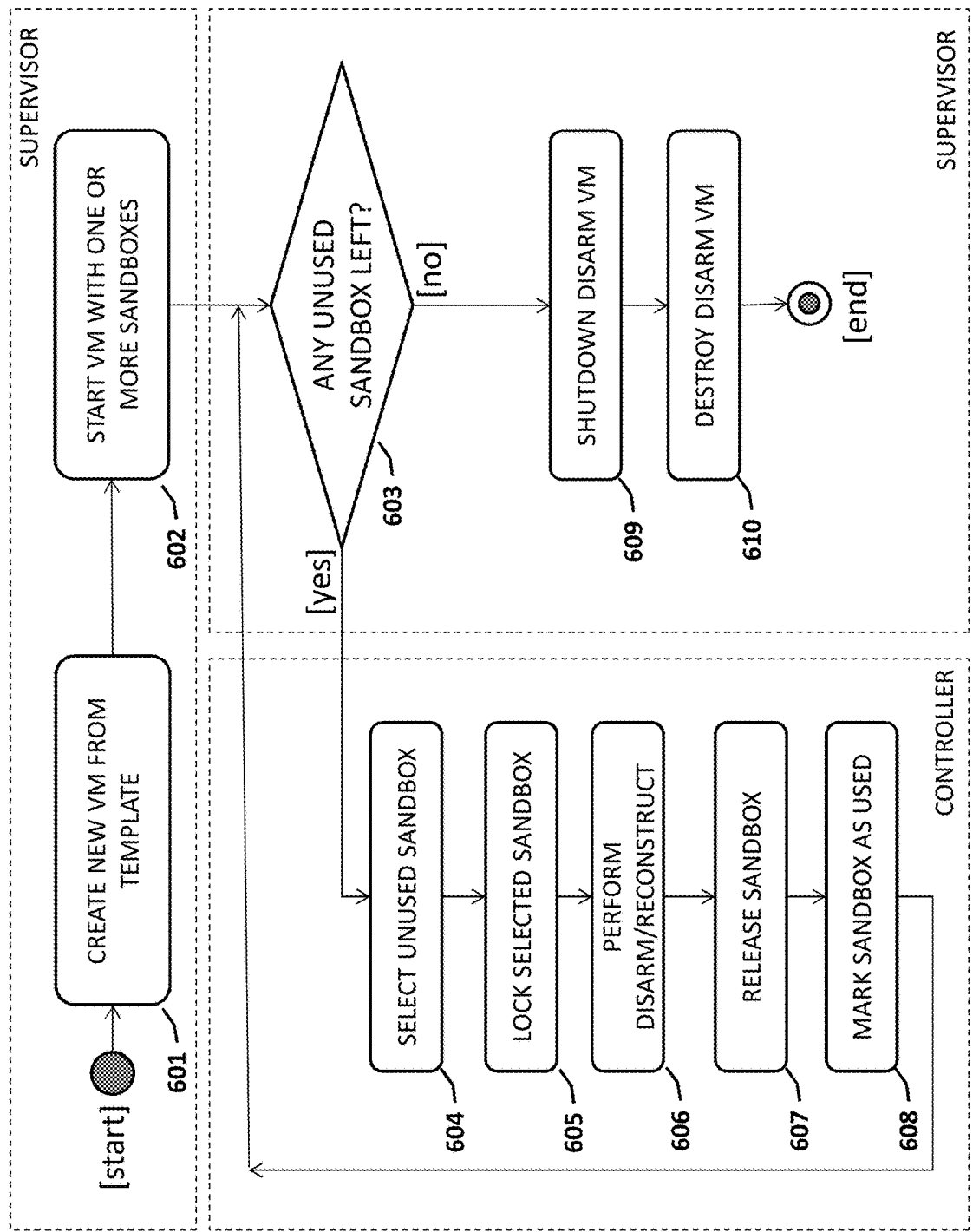
FIG. 6 depicts a lifecycle of a disposable VM according to some embodiments.

A supervisor 208 manages the lifecycle of a disposable VM, such as the disarm VM 206. An exemplary method to manage a disposable VMs lifecycle is depicted in FIG. 6.

FIG. 3 illustrates a file disarm and reconstruction method according to some embodiments. The CDR method may be implemented as a CSP Service. The CDR method starts at a Controller by receiving a data file 301. The data file 301 can be stored in the controller for a maximum time specified by a security policy. A stored data file 301 may be processed at submission time or in the future. The stored data file 301 may be viewed after being cleaned, for example, as depicted in FIG. 5. Next, the controller determines a file type for the data file, applies a corresponding security policy and selects a disarm/reconstruction configuration based on the determined file type. In some embodiments, the security policy can prohibit transmittal of specified file types, for example executable files. In this case the CDR Service does not process the file and may exit with a corresponding return message. In some embodiments, some of the file types can be allowed without modifications, for example, a signed or encrypted data file. In this case, the CDR method does not process the file data and works as a simple file relay. The controller can provide the functionality of application-level firewall based on a file type.

The security policy can define default CDR actions the file type is unrecognized or the file type's disarm/reconstruct software is unavailable. The controller then selects a clean Disarm application sandbox environment based on the file type and sends the data file 301 to the selected sandbox for disarming. A disarm environment receives a data file 302 and performs a transformation of the data file 302 as requested by the controller. During transformation, the data file 302 is deconstructed into basic primitive chunks: (a) known object type chunks and their associated properties are saved as one or more text files 303, and (b) graphics are saved in files 304 in a basic image file format, for example, a Device Independent Bitmap (DIB) format. Each primary chunk is validated according to a file type specification. Potentially dangerous content such as executable code or damaged, incorrect or unknown chunks are not included in the primary chunks. This process eliminates or reduces malicious content in the output chunk files.

After the transformation, the controller downloads the plaintext file 303 and the data file 304 as the disarm files 305, 306 from the disarm environment. The controller ensures that the disarm files 305, 306 are in safe formats, for example, plain text and DIB files, are allowed for the future processing. Upon successful validation by the controller, these files are uploaded to the selected reconstruct environment for reconstruction.

The reconstruct environment transforms plain text 307 and DIB file 308 chunks back into the reconstructed file 309. In some cases, the reconstructed file 309 can have a different file type then the data file 301. In some embodiments, the file type may be updated to a more recent file type version, for example, a MS Word .doc file can be converted into a more recent .docx format.

Upon successful completion, the controller downloads or receives the reconstructed file 309 as the reconstructed file 310 that may be downloaded or received by an originator of the CDR request, like an external client or a plugin.

FIG. 4 depicts a package disarm and reconstruction method according to some embodiments. The method may be implemented as a CSP Service. The CDR method starts at a controller by receiving the incoming package file 401. Next, the controller determines a package type, applies a security policy, and selects a disarm configuration based on the detected package type. Then the controller selects a disarm sandbox in a disarm environment and sends the package to the selected disarm sandbox. The disarm environment receives an incoming package 402, unpackages files 403 from the package file 402 and may generate a warning if any of the package content is invalid. Then the unpackaged files 403 are moved to and output location inside the disarm environment.

After the completion of the unpackaging, the controller downloads the files 403 as resulting files 404 from the disarm environment. The resulting files 404 are processed using the CDR method of FIG. 3. Each successfully processed resulting file 404 is packaged into the a reconstructed package 406 and returned to an originator of the CDR request.

FIG. 5 illustrates a view original data file method according to some embodiments. The method includes receiving a request 501 referencing a successfully processed file. Next, the data file associated with the reference is copied, and a CDR process is initiated on the copied data file. The controller recognizes the type of the copied data file, applies the security policy and selects the preview configuration based on the file type. Then, the controller requests a clean preview transformation from the disarm environment on the original file. The disarm environment receives an incoming file 502 and performs the clean preview transformation on the incoming file 502.

Transformations usually include analysis of the file content and printing the file into DIB files 503. The DIB files 503 may be converted into preview images 504.

After successful completion of the clean preview transformation, the resulted preview images 505 of the original file are returned by the CSP Service to an external client or service.

FIG. 6 depicts a lifecycle of a disposable VM according to some embodiments. The lifecycle of a disposable VM starts with initialization of a clean environment 601 by the supervisor. The supervisor uses a configured hardened template to perform this operation. A disposable VM may contain one or more application sandboxes which provides additional isolation. Next, the supervisor starts the disarm VM 602.

The controller (depicted in the FIGS. 2-5) uses disposable VMs to perform CDR tasks. The controller selects an unused disarm sandbox 604 and first, locks it 605 and consequently performs the CDR task inside the selected sandbox. In some embodiments, a strict network isolation of the disarm environment, see for example FIG. 7, provides that all network connections are initiated by the controller.

After completion of the CDR task in the sandbox controller releases the sandbox 607 and marks it as used 608.

The supervisor monitors all running disarm environments and their state. If the supervisor detects a disarm VM with no unused or locked sandboxes left, it shuts down the corresponding disarm VM 609 and destroys it 610. In some embodiments, the supervisor may also control the state of gateways, controllers and reconstruct environments and, if necessary restarts, creates or shuts down specified environments. In some embodiments, the supervisor may be privileged VM or cloud service that controls the overall system or method. In some embodiments, the supervisor may be a hypervisor.

Figure 7:
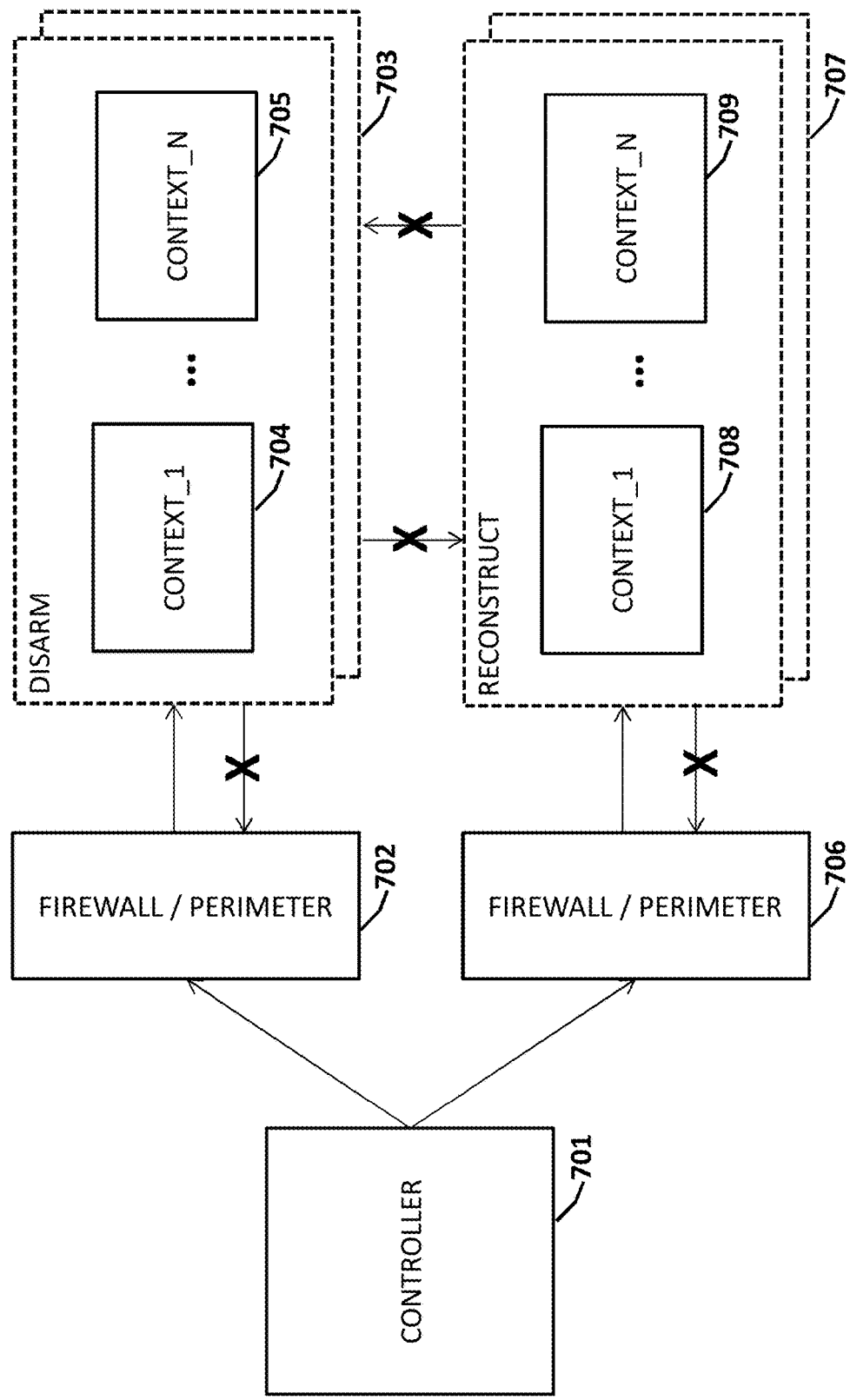
FIG. 7 presents a virtual machine/sandbox isolation according to some embodiments.

FIG. 7 presents virtual machine/sandbox isolation according to some embodiments. Network isolation of disarm 703 and reconstruct 707 environments is enforced by external and independent firewalls 702 and 706. Only incoming connections to the disarm and reconstruct environments are allowed. There are no direct connections between disarm and reconstruct environments. All data transfers are performed through the controller with additional content validation.

Some embodiments of the presently taught method and system may use a defense-in-depth approach and run each CDR task in a separate sandbox 704, 705 to provide an additional layer of the isolation. A compromise of the disarm environment does not lead to further system compromise.

In some environments, a controller, a disarm environment or a reconstruct environment can be implemented as VMs in a physical computing systems (servers) that includes a hardware-assisted hypervisor or containers for stronger sandboxes isolation. Embodiments of the presently taught method and system even assume that individual sandboxes can be compromised while executing disarm tasks and use defense-in-depth approach to secure the whole system.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim as my invention:

1. A file Content Disarm and Reconstruction (CDR) system comprising:
   a physical computer;
   a disarm environment hosted by the physical computer comprising disarm sandboxes to transform a file;
   a reconstruct environment; and
   a controller to classify a file content of a file as a filetype, to provide the file and the filetype to a selected disarm sandbox of the disarm sandboxes for transformation, to receive one or more disarmed files from the selected disarm sandbox, to provide the one or more disarmed files to the reconstruct environment, and to receive a reconstructed file from the reconstruct environment,
   wherein the disarm environment, the reconstruct environment and the controller are isolated and separated from one another by hardware, and
   the selected disarm sandbox transforms the file by deconstructing the file into primitive chunks, by skipping a potentially invalid, malicious or unauthorized primitive chunk of the primitive chunks, by saving a text file comprising an object type and associated properties for each known primitive chunk, and by saving graphics content in the file in a graphics file per a basic image file format.

2. The system of claim 1, further comprising: a gateway to validate, authenticate and authorize a file transformation request, and to route the file transformation request to the controller.

3. The system of claim 1, wherein the controller returns the reconstructed file.

4. The system of claim 1, wherein the controller applies a security policy, based on the filetype, to forbid transformation of the file, to return the file without transformation, to return the one or more disarmed files, or to return the reconstructed file.

5. The system of claim 1, wherein the controller selects the disarm sandbox and the reconstruct environment based on the filetype.

6. The system of claim 1, wherein the controller receives the one or more disarmed files by downloading the one or more disarmed files from the selected disarm sandbox, and the controller receives the reconstructed file by downloading the reconstructed file from the reconstruct environment.

7. The system of claim 1, wherein the controller ensures that each of the one or more disarmed files is in a safe format.

8. The system of claim 1, further comprising:
a first Virtual Machine (VM) to host the controller;
a second VM to host the disarm environment; and
a third VM to host the reconstruct environment.

9. The system of claim 1, wherein the file comprises one or more package files, the filetype is a file package,
the selected disarm sandbox returns the one or more package files as the one or more disarmed files,
for each disarmed file of the one or more disarmed files, the controller classifies a file content of the respective disarmed file as a sub-filetype, receives one or more sub-disarmed files by providing the respective disarmed file and the respective sub-filetype to a selected disarm sandbox of the disarm sandboxes, and receives a sub-reconstructed file by providing the one or more sub-disarmed files to the reconstruct environment;
the controller provides the one or more sub-disarmed files to the reconstruct environment to receive a reconstructed package as the reconstructed file from the reconstruct environment.

10. The system of claim 1, wherein the controller stores the file in a temporary storage, the controller selects a preview configuration based on the filetype, the selected disarm sandbox disarms the file by converting the file to graphics content in a basic image file format, and the selected reconstruct sandbox reconstructs by converting the one or more disarmed files into the reconstructed file in a preview image format.

11. The system of claim 1, further comprising:
a computing system to host Virtual Machines (VMs); and
a supervisor, wherein the supervisor creates, manages and disposes of VMs, and wherein the supervisor creates a VM to host the disarm environment using a preconfigured hardened template.

12. The system of claim 1, wherein each of the disarm sandboxes is used only once by the controller, the supervisor disposes of the disarm environment when a count of unused disarm sandboxes is less than a threshold, and the supervisor re-creates the disarm environment using the preconfigured hardened template.

13. The system of claim 12, wherein the supervisor comprises a more privileged VM than the VM hosting the disarm environment.

14. The system of claim 12, wherein the computing system is selected from a single computer, a mobile device, a dedicated server, a serverless service or a cloud service.

15. The system of claim 12, further comprising a firewall configured to block network connections originating from the disarm environment, to block network connections originating from the reconstruct environment, to allow a network connection to the disarm environment only from the controller, and to allow a network connection to the reconstruct environment only from the controller.

16. The system of claim 12, further comprising a VM to host the firewall.

17. The system of claim 15, further comprising:
a first VM to host the controller; and
a second VM to host the reconstruct environment.

18. The system of claim 1, further comprising an external network firewall configured to block network connections originating from the disarm environment, to block network connections originating from the reconstruct environment, to allow a network connection to the disarm environment only from the controller, and to allow a network connection to the reconstruct environment only from the controller.

19. The system of claim 1, wherein the disarm environment comprises one or multiple disposable virtual machines.

20. The system of claim 1, wherein one or more of the controller, the disarm environment and the reconstruct environment comprise a virtual machine, a dedicated server, a serverless service or a cloud service.

21. The system of claim 1, wherein the file comprises network traffic of a network protocol.

* * * * *